(12) United States Patent
Rubino

(10) Patent No.: US 10,611,913 B2
(45) Date of Patent: Apr. 7, 2020

(54) METHOD OF ENHANCING SURFACE ELECTRICAL CONDUCTIVITY OF CONDUCTIVE PLASTICS AND CONDUCTIVE PLASTIC FILMS PRODUCED THEREBY

(71) Applicant: Delphi Technologies, LLC, Troy, MI (US)

(72) Inventor: Evangelia Rubino, Warren, OH (US)

(73) Assignee: DELPHI TECHNOLOGIES, LLC, Troy, MI (US)

( * ) Notice: Subject to any disclaimer, the term of this patent is extended or adjusted under 35 U.S.C. 154(b) by 0 days.

(21) Appl. No.: 15/962,472

(22) Filed: Apr. 25, 2018

(65) Prior Publication Data

US 2018/0244916 A1 Aug. 30, 2018

Related U.S. Application Data

(63) Continuation-in-part of application No. 15/042,188, filed on Feb. 12, 2016, now abandoned.

(51) Int. Cl.
*C08L 77/00* (2006.01)
*C08K 3/08* (2006.01)
(Continued)

(52) U.S. Cl.
CPC .......... *C08L 77/00* (2013.01); *B29C 48/0018* (2019.02); *C08K 3/04* (2013.01); *C08K 3/08* (2013.01); *C08K 7/04* (2013.01); *C08K 7/06* (2013.01); *C08K 9/02* (2013.01); *H01B 1/22* (2013.01); *H01B 1/24* (2013.01); *H01B 3/004* (2013.01); *H01B 3/305* (2013.01); *B29C 2948/92514* (2019.02); *B29C 2948/92561* (2019.02); *B29C 2948/92704* (2019.02); *B29K 2077/00* (2013.01); *B29K 2305/08* (2013.01); *B29K 2307/04* (2013.01); *B29K 2995/0005* (2013.01); *B29K 2995/0006* (2013.01);
(Continued)

(58) Field of Classification Search
None
See application file for complete search history.

(56) References Cited

U.S. PATENT DOCUMENTS 2,772,190 A 11/1956 Haayman et al.
3,083,169 A 3/1963 Ueda
(Continued)

OTHER PUBLICATIONS

Kuriger, et al., Processing and Characterization of Aligned Vapor Grown Carbon Fiber Reinforced Polypropylene, Composites Part A: Applied Science and Manufacturing, vol. 33, Issue 1 53-62 (Year 2002).

*Primary Examiner* — William D Young
(74) *Attorney, Agent, or Firm* — Robert J. Myers

(57) ABSTRACT

A method of enhancing surface electrical conductivity of an article formed of a conductive polymer material, such as a conductive polymer film, includes the step of providing an article formed of a conductive polymer. The conductive polymer is made up of a dielectric polymeric material and conductive fibers. A desired pressure is applied to at least a portion of the article while simultaneously heating at least a portion of the article to a desired temperature. The desired pressure and the desired temperature are maintained on at least a portion of the article for a desired time period. This method reduces a polymer-rich skin layer on the surface of the conductive polymer material and helps to randomize the orientation of the conductive fibers on the surface.

9 Claims, 6 Drawing Sheets

(51) Int. Cl.
 *H01B 1/22* (2006.01)
 *C08K 7/04* (2006.01)
 *C08K 9/02* (2006.01)
 *H01B 3/30* (2006.01)
 *C08K 3/04* (2006.01)
 *B29C 48/00* (2019.01)
 *C08K 7/06* (2006.01)
 *H01B 1/24* (2006.01)
 *H01B 3/00* (2006.01)
 *B29K 77/00* (2006.01)
 *B29K 305/08* (2006.01)
 *B29K 307/04* (2006.01)

(52) U.S. Cl.
 CPC ............... *C08K 2003/0862* (2013.01); *C08K 2201/001* (2013.01); *C08L 2203/16* (2013.01)

(56) References Cited

U.S. PATENT DOCUMENTS

| | | |
|---|---|---|
| 4,216,423 A | 8/1980 | Davenport |
| 4,500,603 A | 2/1985 | Freundlich |
| 4,604,427 A | 8/1986 | Roberts et al. |
| 4,855,024 A | 8/1989 | Drachnik et al. |
| 7,776,249 B2 | 8/2010 | Datta |
| 8,865,040 B2 | 10/2014 | Jang et al. |
| 2008/0064279 A1 | 3/2008 | Browning et al. |
| 2013/0233485 A1 | 9/2013 | Herr et al. |
| 2014/0216644 A1 | 8/2014 | Keite-Telgenbuscher |

METHOD OF ENHANCING SURFACE ELECTRICAL CONDUCTIVITY OF CONDUCTIVE PLASTICS AND CONDUCTIVE PLASTIC FILMS PRODUCED THEREBY

CROSS-REFERENCE TO RELATED APPLICATION

This application is a continuation-in-part application and claims benefit under 35 U.S.C. § 120 of U.S. patent application Ser. No. 15/042,188, filed Feb. 12, 2016, the entire disclosure of which is hereby incorporated herein by reference.

TECHNICAL FIELD OF THE INVENTION

The invention relates to a method of enhancing surface electrical connectivity in conductive plastics, in particular to enhancing surface electrical connectivity by applying heat and pressure to a conductive plastics surface.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Presented herein is a method of enhancing the surface electrical conductivity of an article formed of an extruded conductive polymer material containing a polymer material and conductive fibers, e.g. an extruded tape, an extruded cable, or a conductive plastic film. The method involves the application of heat and pressure to at least a portion of the article for a predetermined time period. These conductive plastic articles may be used to provide shielding for electromagnetic compliance (EMC) and/or electromagnetic interference (EMI). Without subscribing to any particular theory of operation, the electrical conductivity of the surface of the conductive polymer material is enhanced or improved by diminishing the polymer-rich skin layer on the surface by redistributing the polymer material and reorienting the conductive fibers.

Figure 1:
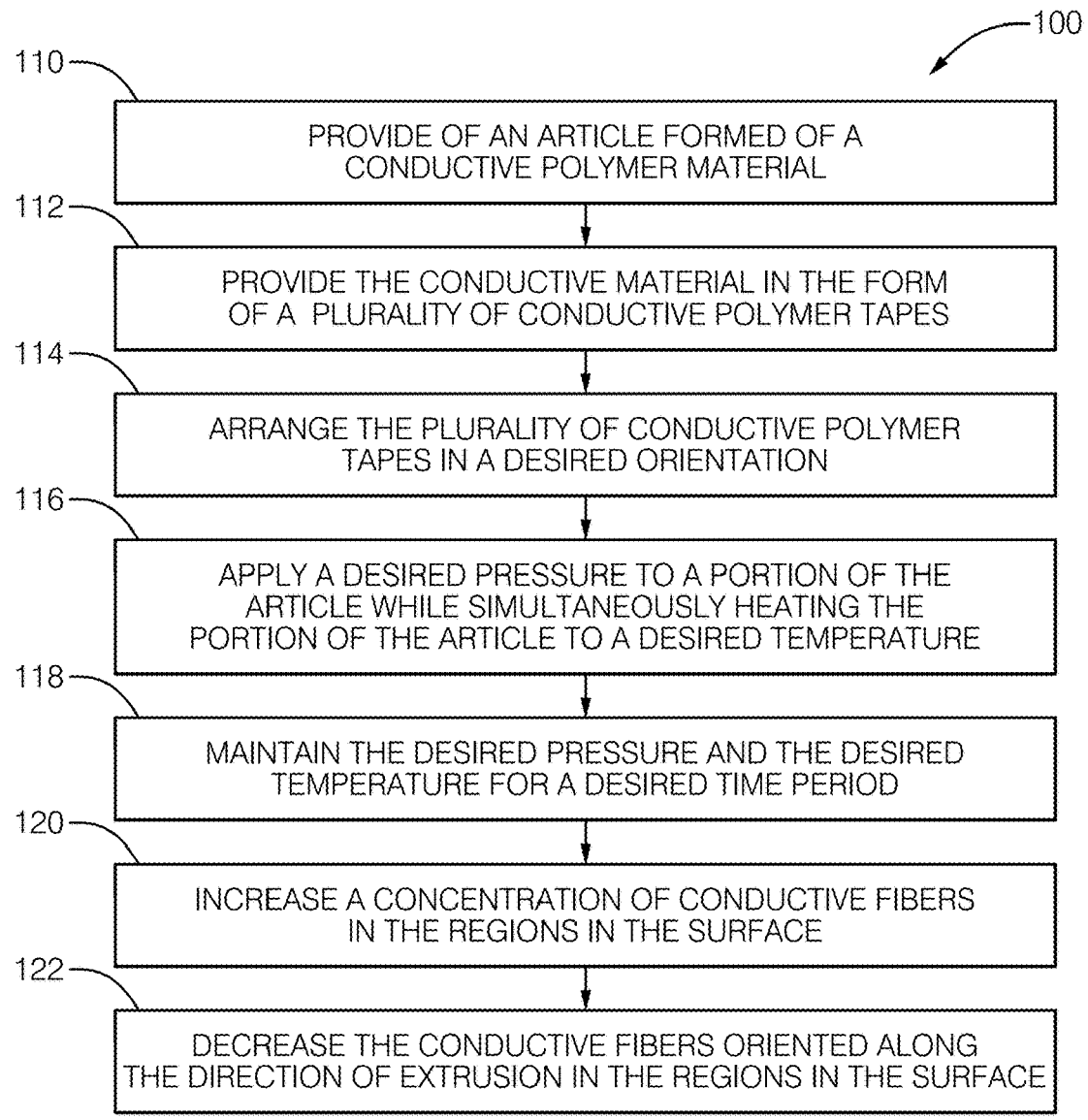
FIG. 1 is a flowchart of a method of enhancing surface electrical conductivity of an article formed of a conductive polymer material according to several embodiments.

FIG. 1 shows a flow chart of a method 100 for enhancing the surface electrical conductivity of an article 10 formed of a conductive polymer material 12.

Figure 2:
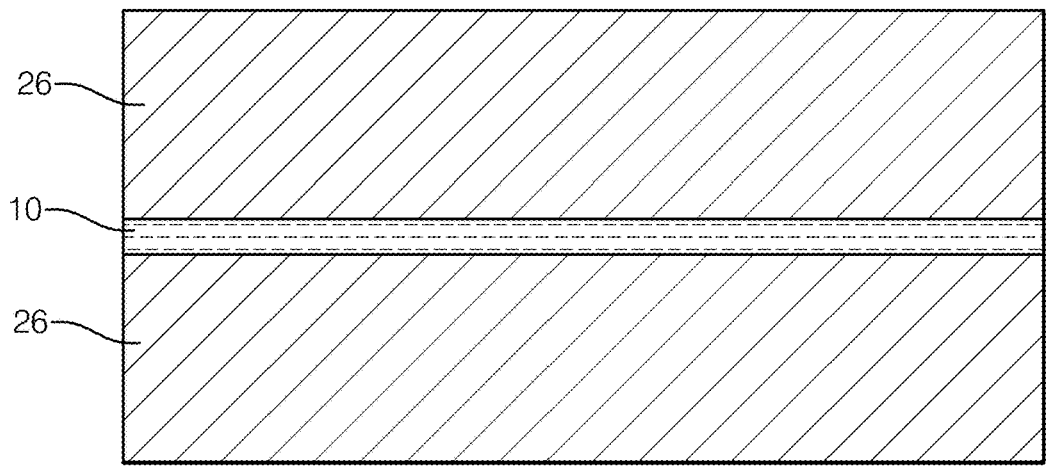
FIG. 2 is a side cross section view of an article formed of a conductive polymer between the platens of a heated press according to several embodiments.
Figure 3:
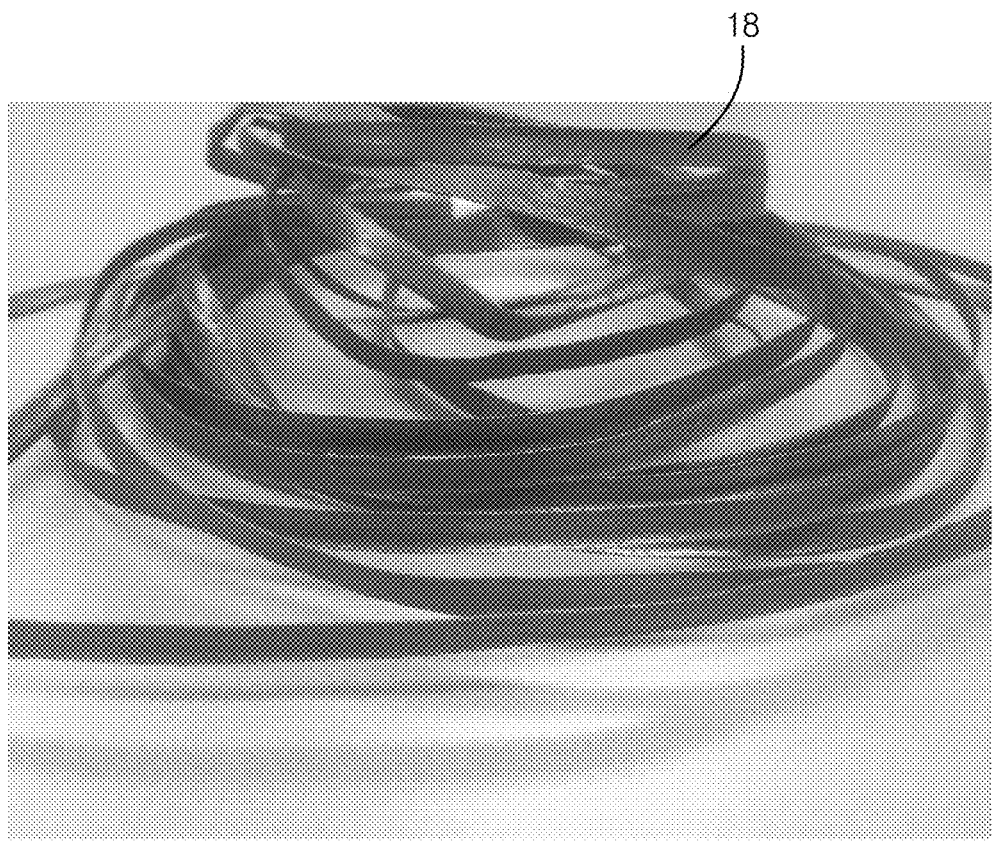
FIG. 3 is a photograph of an extruded length of conductive polymer tape prior to being processed according to the method of FIG. 1.
Figure 4:
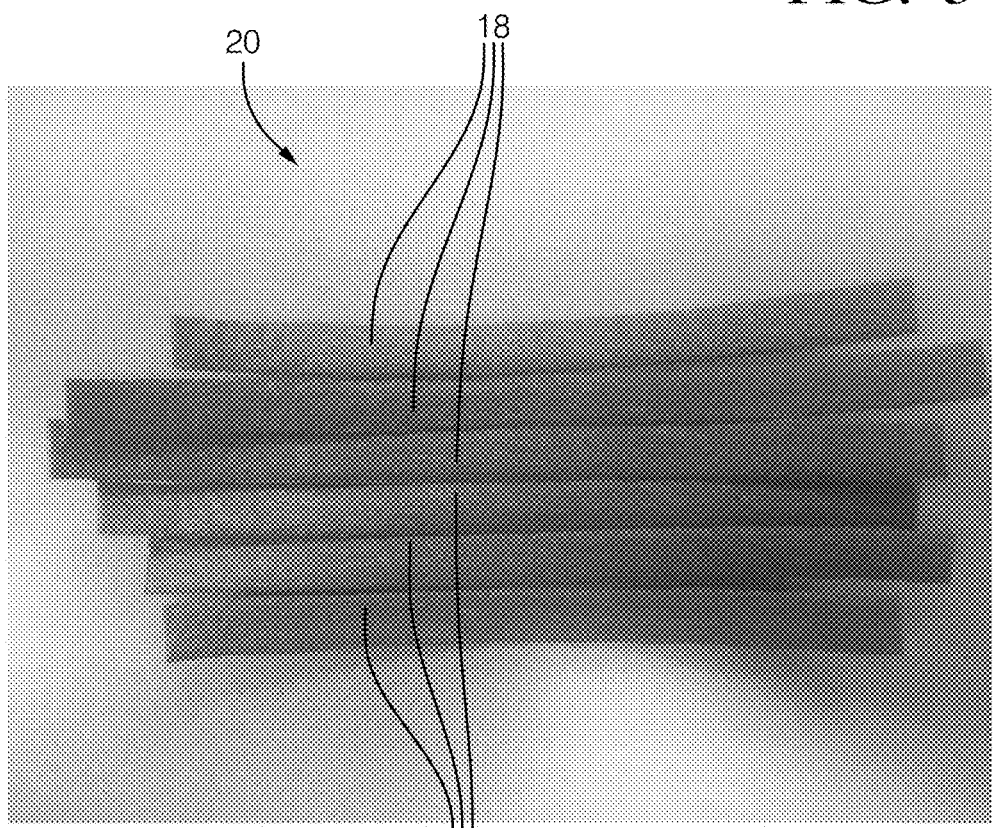
FIG. 4 is a photograph of a plurality of conductive polymer tapes arranged in an adjacent parallel fashion prior to being processed according to the method of FIG. 1.
Figure 5:
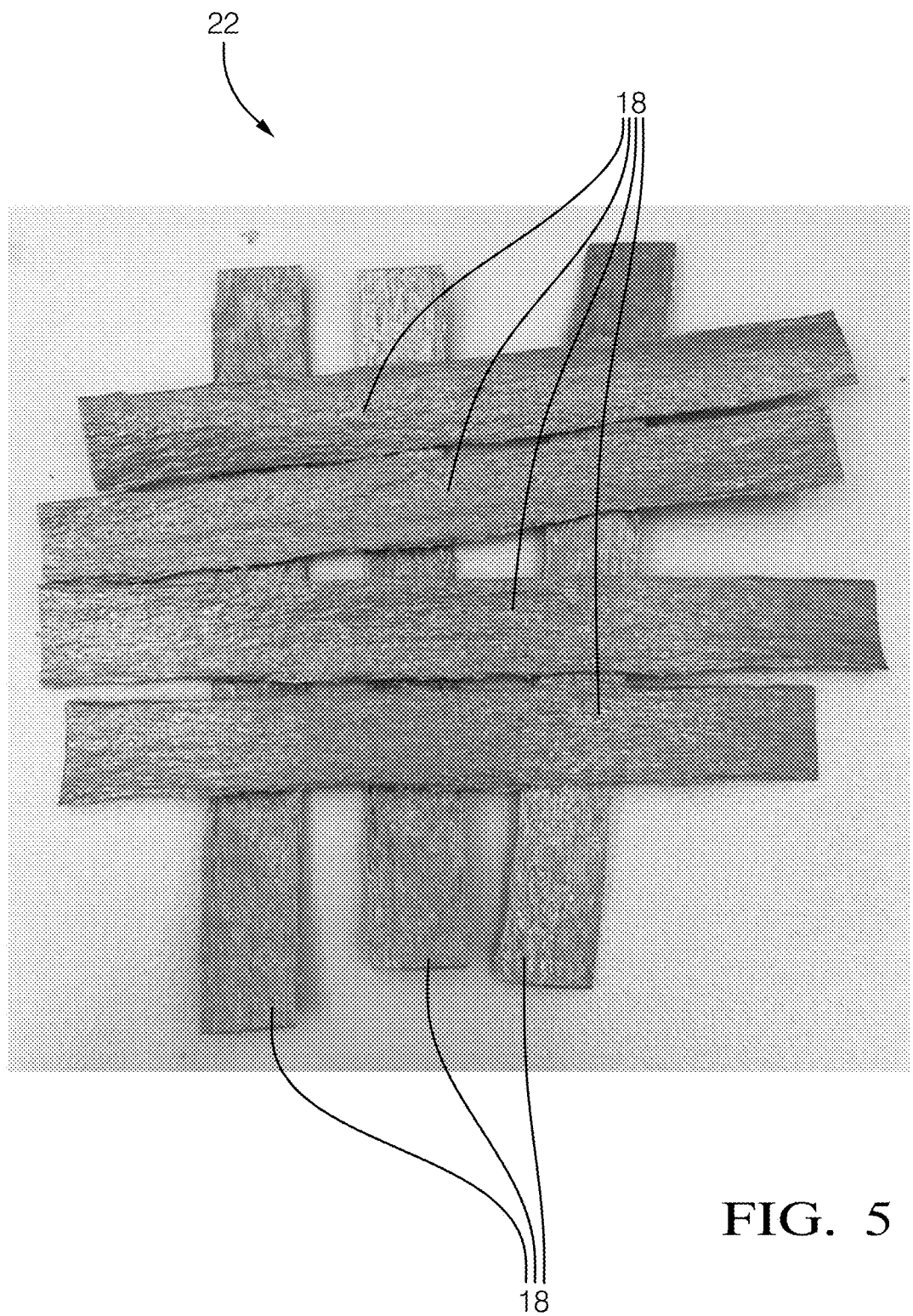
FIG. 5 is a photograph of a plurality of conductive polymer tapes arranged in an overlapping perpendicular fashion prior to being processed according to the method of FIG. 1.
Figure 6:
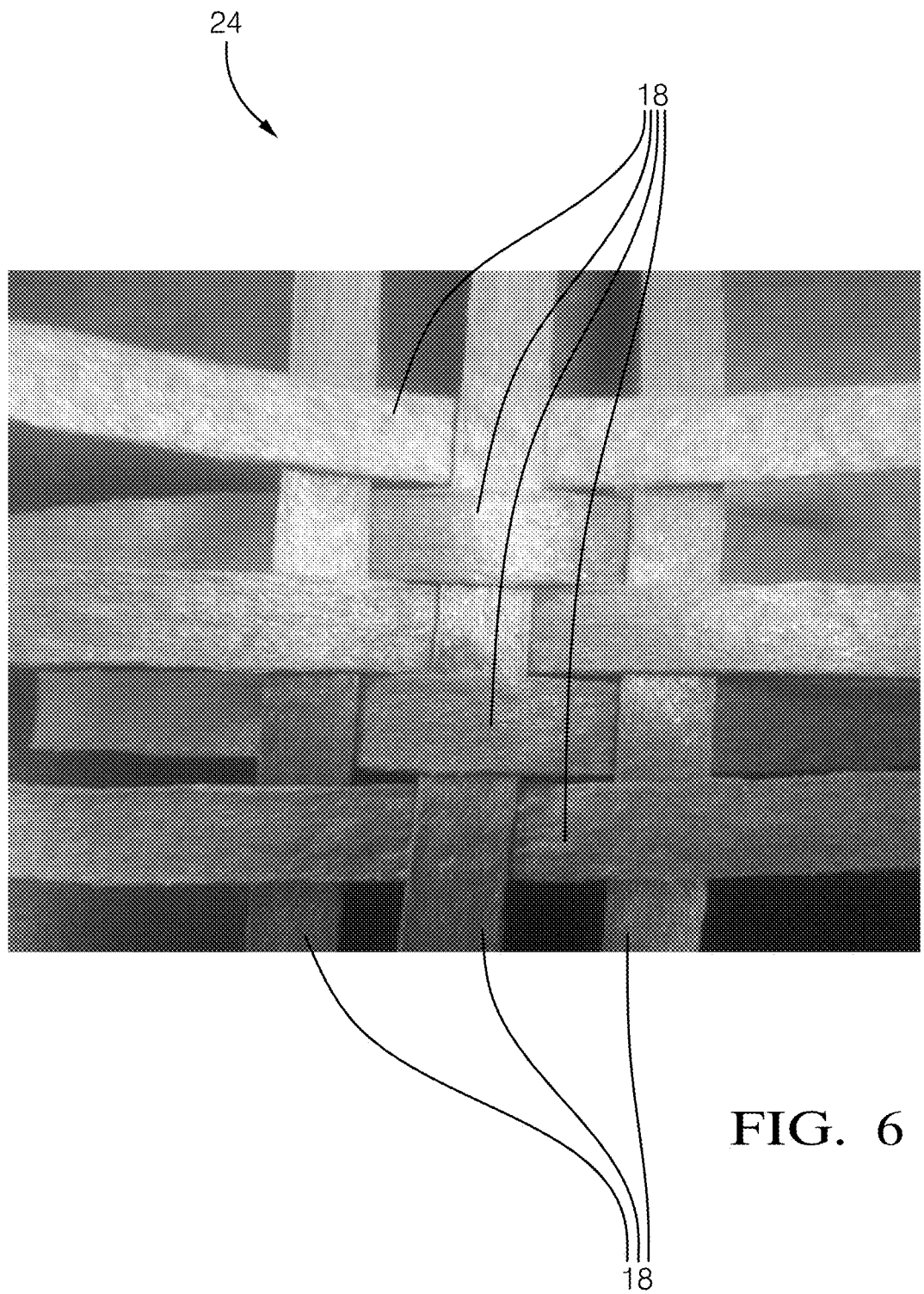
FIG. 6 is a photograph of a plurality of conductive polymer tapes arranged in an interwoven fashion prior to being processed according to the method of FIG. 1.

STEP 110, PROVIDE AN EXTRUDED ARTICLE FORMED OF A CONDUCTIVE POLYMER MATERIAL, includes providing the extruded article 10 formed of the conductive polymer material 12 comprising a dielectric polymeric material 14 and conductive fibers 16, such as the extruded tape formed of a conductive polymer material 12 describe above;

STEP 112, PROVIDE THE CONDUCTIVE POLYMER ARTICLE IN THE FORM OF A PLURALITY OF CONDUCTIVE POLYMER TAPES, is an optional step that includes providing the conductive polymer article 10 in the form of a plurality of conductive polymer tapes 18, as shown in FIG. 3;

STEP 114, ARRANGE THE PLURALITY OF CONDUCTIVE POLYMER TAPES IN A DESIRED ORIENTATION, is an optional step that includes arranging the plurality of conductive polymer tapes 18 in a desired orientation, such as in adjacent parallel fashion 20 as shown in FIG. 4, an overlapping perpendicular fashion 22 as shown in FIG. 5, or an interwoven fashion 24 as shown in FIG. 6;

STEP 116, APPLY A DESIRED PRESSURE TO AT LEAST A PORTION OF THE ARTICLE WHILE SIMULTANEOUSLY HEATING AT LEAST A PORTION OF THE ARTICLE TO A DESIRED TEMPERATURE, includes applying a desired pressure to at least a portion of the article 10 while simultaneously heating at least a portion of the article 10 to a desired temperature. In a non-limiting example the article 10 is disposed between the platens 26 of a heated press (see FIG. 2), such a Model 12-12H produced by Carver, Inc. of Wabash, Ind. and the pressure and heat required to obtain the desired pressure and temperature are provided by the heated press. The desired pressure is about 27,580 kilopascals (2 tons per inch) and the desired temperature is in a range from about 163° C. to about 190° C. (about 325° F. to about 375° F.). As used herein, the term "about" means that the value of the modified unit may vary ±5% from the stated value;

STEP 118, MAINTAIN THE DESIRED PRESSURE AND THE DESIRED TEMPERATURE ON THE AT LEAST A PORTION OF THE ARTICLE FOR A DESIRED TIME PERIOD, includes maintaining the desired pressure and the desired temperature on the at least a portion of the article 10 for a desired time period. In this non-limiting example the desired time period is about ten minutes;

STEP 120, INCREASE A CONCENTRATION OF CONDUCTIVE FIBERS IN THE REGIONS IN THE SURFACE, includes increasing the concentration of conductive fibers, e.g. nickel plated carbon fibers, in the regions in the surface, e.g. above a concertation of 10% by volume; and STEP 122, DECREASE THE CONDUCTIVE FIBERS ORIENTED ALONG THE DIRECTION OF EXTRUSION IN THE REGIONS IN THE SURFACE, includes decreasing the percentage of conductive fibers, e.g. the nickel plated carbon fibers, that are oriented along the direction of extrusion in the regions in the surface, e.g. to less than 50%.

According to one embodiment of the invention, a conductive polymer tape 18 having enhanced surface electrical conductivity was formed by performing STEPS 110, 116, and 118 of the method 100. According to this embodiment, the conductive polymer article 10 is provided in the form of a conductive polymer tape 18 having a thickness of about 0.25 millimeters.

Figure 7:
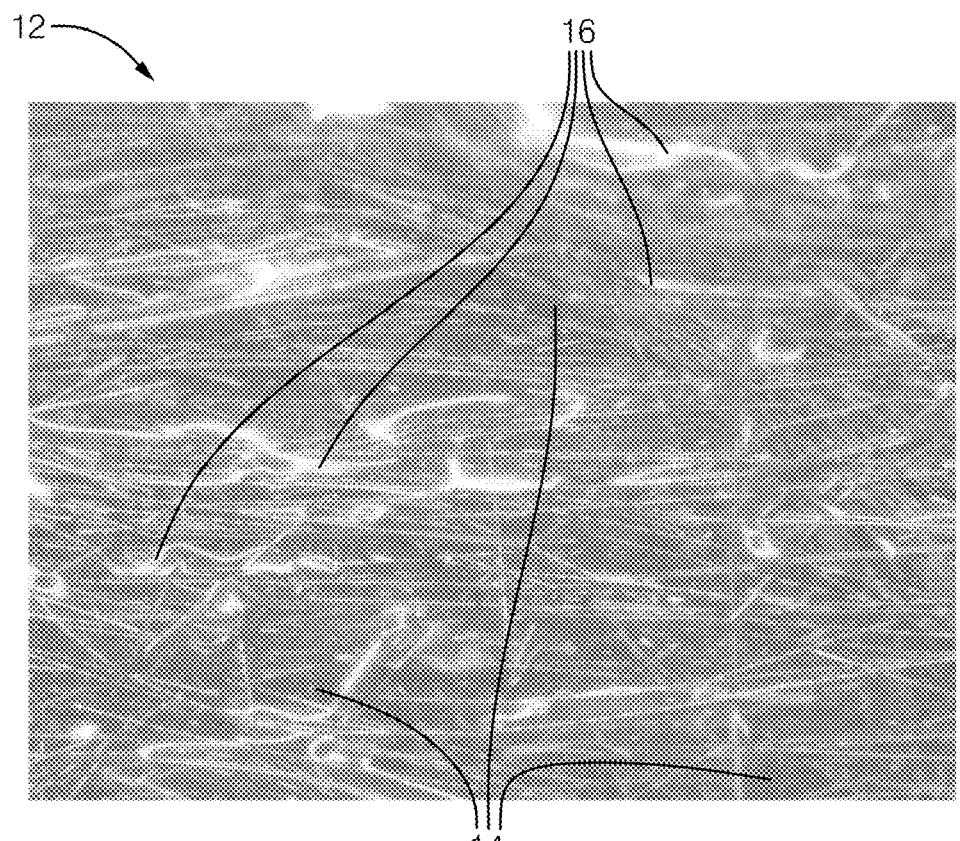
FIG. 7 is a photomicrograph of a surface of a conductive polymer film prior to being processed according to the method of FIG. 1.

FIG. 7 shows a photomicrograph of the polymer-rich skin layer on the surface of the conductive polymer tape 18 processing according to method 100. The conductive polymer tape 18 in this non-limiting example is made of a polyamide (NYLON) material filled with 10% to 14% nickel plated carbon fibers 16 by volume. The nickel plated carbon fibers 16 have diameter of about 5 to 10 microns and a length of 3 to 6 millimeters. As can be seen in this photomicrograph, there are regions of the surface that are composed primarily of the polymer material 14 (dark regions) and these regions have less than 10% nickel plated carbon fibers 16 by volume. In addition, at least 60% of the conductive fibers 16 (light regions) are oriented along the direction of extrusion, thereby reducing the number of interconnections between the conductive fibers 16. Both of these conditions contribute to a reduced surface electrical conductivity (i.e., increased surface electrical resistance) of skin layer. The surface resistance of the conductive polymer tape 18 as measured by a standard ohmmeter was 38Ω to 170Ω.

Figure 8:
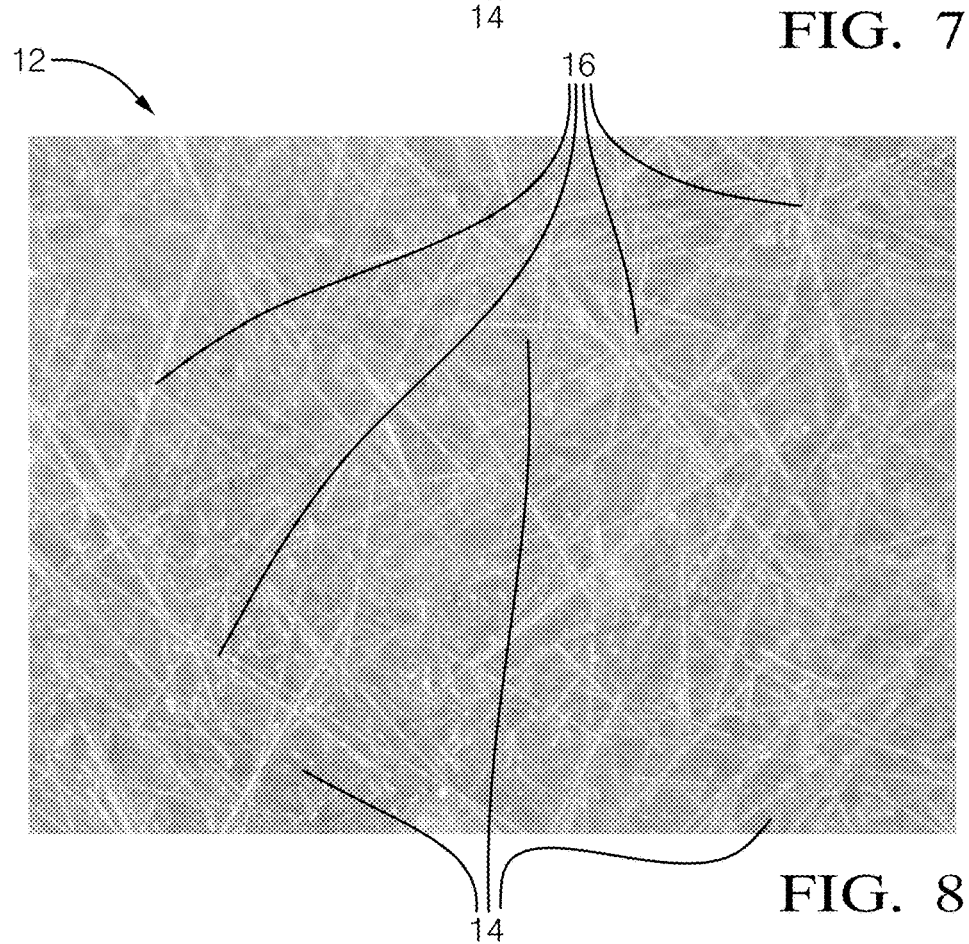
FIG. 8 is a photomicrograph of a surface of a conductive polymer film after being processed according to the method of FIG. 1 according to one embodiment.

This conductive polymer tape 18 was then subjected to a pressure of about 27,580 kilopascals (2 tons per inch) at a temperature of about 177° C. (350° F.) for about ten minutes in a heated press according to method 100. The photomicrograph of FIG. 8, taken after processing the plurality of tapes into a film according to method 100, shows the surface of the conductive polymer tape 18. As can be seen by comparing FIG. 7 with FIG. 8, the size of the regions on the surface, i.e. the surface area, composed primarily of the polymer material 14 (dark regions) i.e. having less than 10% nickel plated carbon fibers 16 by volume is greatly diminished, reducing the electrically insulative polymer material 14 on the surface. In addition, the orientation of the conductive fibers 16 is more randomized, i.e. the percentage of conductive fibers aligned along the direction of extrusion is reduced below 50%, thus improving the electrical connections between the conductive fibers 16. Following this processing, the surface resistance of the conductive polymer tape 18 was measured again and the resistance measurements were found to be in the range of 2 Ω to 105Ω, providing an improvement in surface conductivity of 162% to 1900%.

Figure 9:
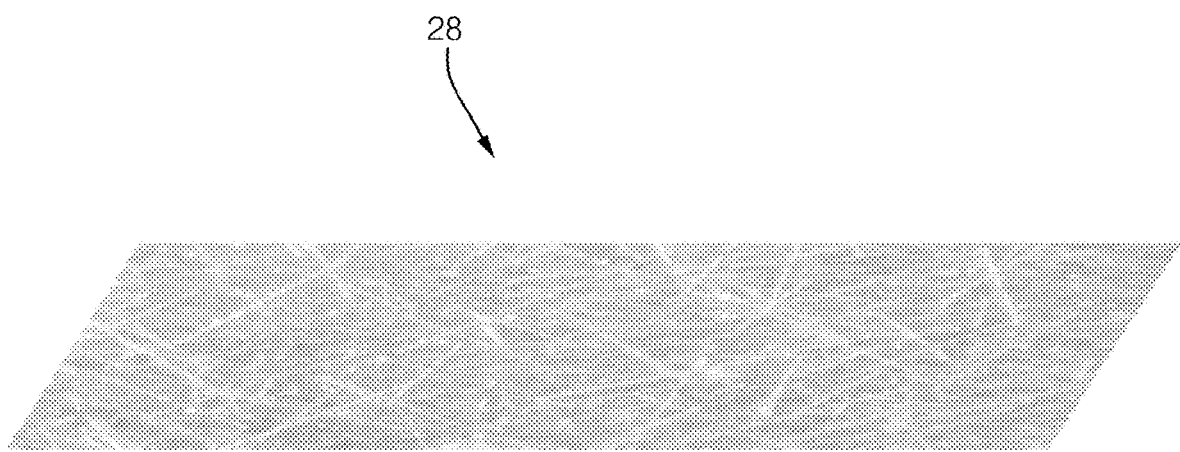
FIG. 9 is a photograph of a conductive polymer film formed of a plurality of conductive polymer tapes after being processed according to the method of FIG. 1 according to another embodiment.

According to another embodiment of the invention, a conductive polymer film sheet 28 having enhanced surface electrical conductivity was formed by performing STEPS 110, 112, optional STEPS 114, 116, and STEP 118 of the method 100. According to this embodiment, the conductive polymer article 10 is provided in the form of a plurality of extruded conductive polymer tapes 18 having a thickness of about 0.1 millimeters to about 4 millimeters. The plurality of conductive polymer tapes 18 were arranged according to one of the various arrangements shown in FIGS. 4-6. The arrangement of conductive polymer tapes 18 was then subjected to a pressure of about 27,580 kilopascals (2 tons per inch$^2$) at about 177° C. (350° F.) for about ten minutes in a heated press according to method 100. The resulting conductive polymer film sheet 28 is shown in FIG. 9. Such a conductive polymer film sheet 28 could be used to provide EMC and/or EMI shielding by vacuum forming the conductive polymer film sheet 28 to the exterior of an electrical assembly, such as a connector body (not shown). This would provide an advantage of using much less conductive polymer material that a connector body molded entirely of a conductive polymer material.

The desired combinations of pressure, temperature and time presented for the method 100 herein have been found to produce satisfactory improvements in surface conductivity. However, these combinations of pressure, temperature and time conditions have not yet been optimized, so other combinations of pressure, temperature, and time may be found to produce satisfactory or even superior results.

While the examples of conductive polymer materials presented herein are nickel plated carbon fiber filled polyamide materials, alternative embodiments with the conductive polymer material containing other polymeric materials, such as polybutylene terephthalate (PBT), polypropylene (PP), or polyethylene (PE), and/or other conductive fibers, such as copper plated carbon fibers, may be envisioned.

While the embodiments of the method 100 presented herein show a heated press used to provide pressure and heat, alternative embodiments, such as using a heated roller for processing conductive polymer films, may also be envisioned. In other embodiments, heat and pressure may alternatively be applied by the horn of an ultrasonic welding machine.

While the embodiments presented herein are directed to extruded conductive polymer tapes, alterative embodiments directed to methods of enhancing surface electrical conductivity of molded article formed of a conductive polymer material and the articles produced by such a method may also be envisioned. The heat and pressure applied during the method 100 could cause deformation in the molded article, so care should be taken to provide countermeasures for the distortion in the design of the molded article, such as dimensioning the molded article to account for the deformation or selecting a portion of the molded article to apply the heat and pressure where deformation would not impact the performance of the article.

Accordingly, a method of enhancing surface electrical conductivity of an article formed of a conductive polymer material and a conductive polymer material produced by such a method is provided. The method improves the surface conductivity (i.e. lowers surface resistivity) by diminishing the polymer-rich surface layer and reorienting the conductive fibers in a more random fashion. The method provides the enhanced surface conductivity without the use of mechanical surface treatments, chemical surface treatments, water soluble resins, metal films, or conductive paints.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'One or more' includes a function being performed by one element, a function being performed by more than one element, e.g., in a distributed fashion, several functions being performed by one element, several functions being performed by several elements, or any combination of the above.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

While terms of ordinance or orientation may be used herein, these elements should not be limited by these terms. All terms of ordinance or orientation, unless stated otherwise, are used for purposes distinguishing one element from another, and do not denote any particular order, order of operations, direction or orientation unless stated otherwise.

I claim:

1. A method of enhancing surface electrical conductivity of an article formed of a conductive polymer material, comprising the steps of:
    extruding an article formed of the conductive polymer material comprising a dielectric polymeric material and 10% to 14% conductive fibers by volume of the conductive polymer material, wherein a polymer-rich skin layer on a surface of the article has a concentration of conductive fibers in the skin layer that is less than 10% by volume of the skin layer and wherein at least 60% of the conductive fibers in the skin layer are oriented along the direction of extrusion;
    applying a desired pressure to at least a portion of the article while simultaneously heating the at least a portion of the article to a desired temperature; and
    maintaining the desired pressure and the desired temperature on the at least a portion of the article for a desired time period;
    increasing the concentration of the conductive fibers in the skin layer to above 10% by volume; and
    reorienting the conductive fibers in the skin layer such that less than 50% of the conductive fibers in the skin layer are oriented along the direction of extrusion.

2. The method according to claim 1, wherein the desired pressure is about 27,580 kilopascals.

3. The method according to claim 1, wherein the desired temperature is in a range from about 163° C. to about 190° C.

4. The method according to claim 1, wherein the desired time period is about 10 minutes.

5. The method according to claim 1, wherein the dielectric polymeric material is polyamide and the conductive fibers are nickel plated carbon fibers.

6. A method of forming a conductive polymer film having enhanced surface electrical conductivity, comprising the steps of:
    extruding a conductive polymer tape comprising a dielectric polymeric material and 10% to 14% conductive fibers by volume, wherein a polymer-rich skin layer on a surface of the conductive polymer tape has a concentration of conductive fibers in the skin layer that is less than 10% by volume and wherein at least 60% of the conductive fibers in the skin layer are oriented along the direction of extrusion;
    applying a desired pressure to the conductive polymer tape while simultaneously heating the conductive polymer tape to a desired temperature; and
    maintaining the desired pressure and the desired temperature for a desired time period;
    increasing the concentration of the conductive fibers in the skin layer to above 10% by volume; and
    reorienting the conductive fibers in the skin layer such that less than 50% of the conductive fibers in the skin layer are oriented along the direction of extrusion.

7. The method according to claim 6, wherein the desired pressure is about 27,580 kilopascals.

8. The method according to claim 6, wherein the desired temperature is in a range from about 163° C. to about 190° C.

9. The method according to claim 6, wherein the desired time period is about 10 minutes.

* * * * *